(12) United States Patent
O et al.

(10) Patent No.: US 8,014,643 B2
(45) Date of Patent: Sep. 6, 2011

(54) PHOTONIC CRYSTAL WAVEGUIDE INLET STRUCTURE

(75) Inventors: Beom-Hoan O, Incheon (KR); Dong-Jin Lee, Chungcheongnam-do (KR)

(73) Assignee: Inha-University Industry Partnership Institute, Incheon (KR)

( * ) Notice: Subject to any disclaimer, the term of this patent is extended or adjusted under 35 U.S.C. 154(b) by 0 days.

(21) Appl. No.: 12/391,075

(22) Filed: Feb. 23, 2009

(65) Prior Publication Data

US 2010/0142893 A1    Jun. 10, 2010

(30) Foreign Application Priority Data

Dec. 4, 2008    (KR) .................. 10-2008-0122359

(51) Int. Cl.
G02B 6/26    (2006.01)
(52) U.S. Cl. .............................. 385/50; 385/39; 385/129
(58) Field of Classification Search .................. None
See application file for complete search history.

(56) References Cited

U.S. PATENT DOCUMENTS 6,795,621 B2 *    9/2004    Tokushima .................. 385/50
7,158,710 B1 *    1/2007    Zhou ........................... 385/129

OTHER PUBLICATIONS

Vlasov et al. Coupling into the slow light mode in slab-type photonic crystal waveguides. Optics Letters, vol. 31 No. 1, Jan. 2006, pp. 50-52.*

* cited by examiner

*Primary Examiner* — Sarah Hahm
(74) *Attorney, Agent, or Firm* — Nelson Mullins Riley & Scarborough LLP; EuiHoon Lee, Esq.

(57) ABSTRACT

Disclosed herein is a photonic crystal waveguide inlet structure for improving coupling efficiency of a strip waveguide and a photonic crystal waveguide. The photonic crystal waveguide inlet structure includes an inlet region of the photonic crystal waveguide. The photonic crystal waveguide includes photonic crystals in which air holes are arranged in a triangle lattice shape in a dielectric, and a hybrid waveguide in which at least one of the air holes is removed, the hybrid waveguide spacing the inlet region apart from the strip waveguide.

2 Claims, 12 Drawing Sheets

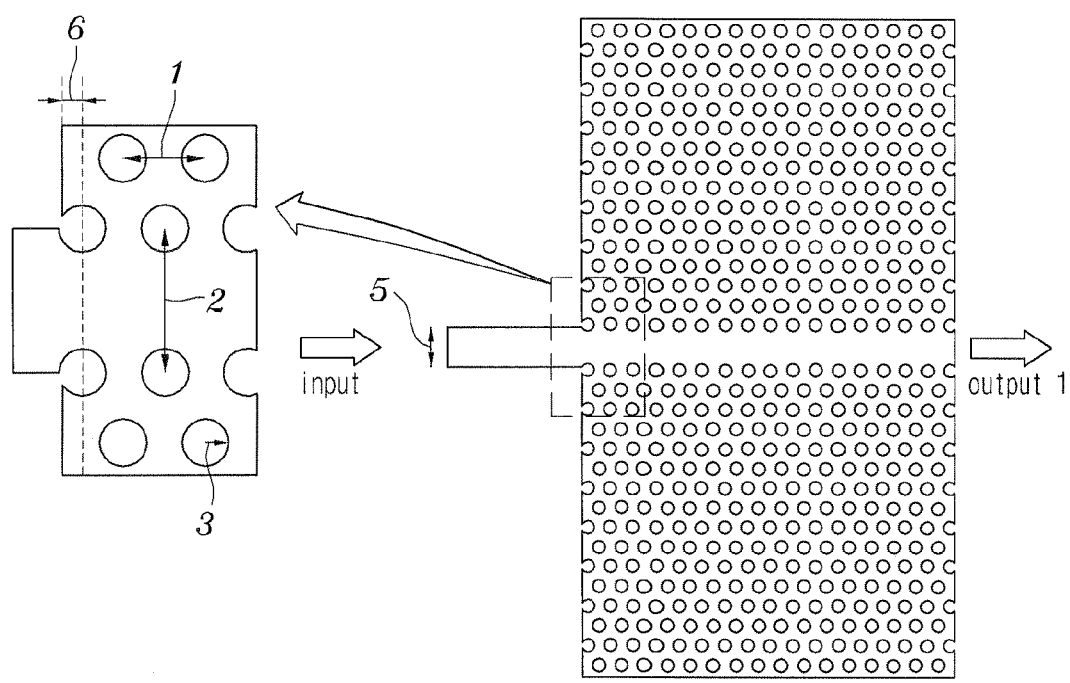
Prior Art

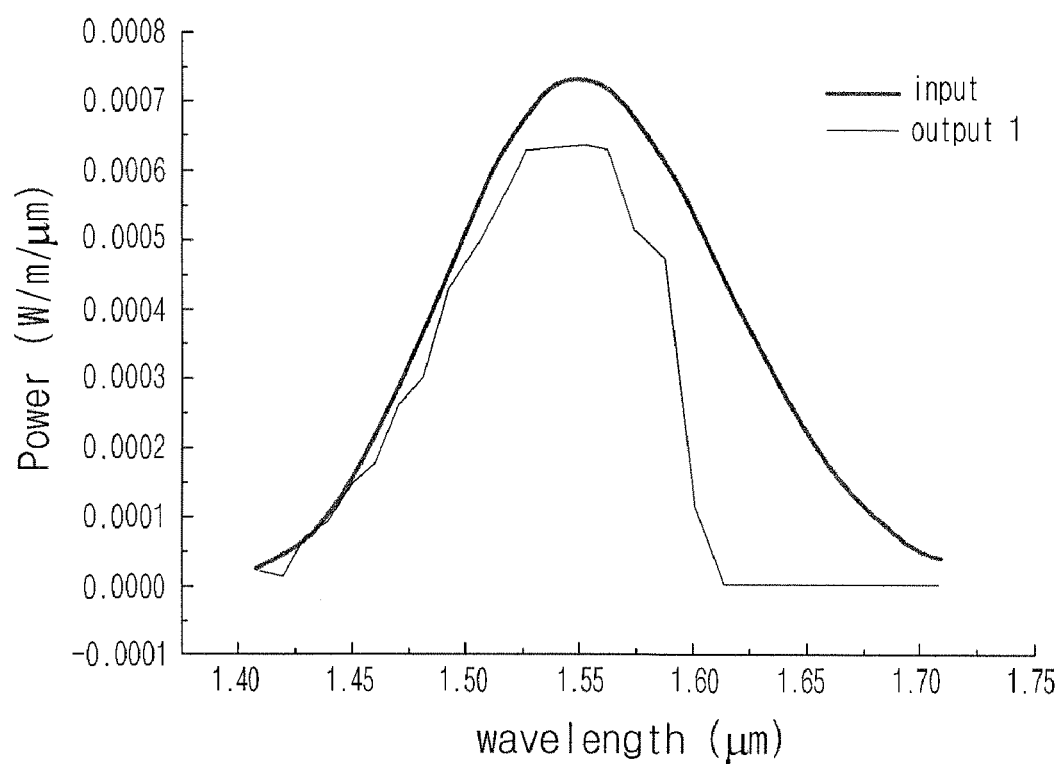
Prior Art

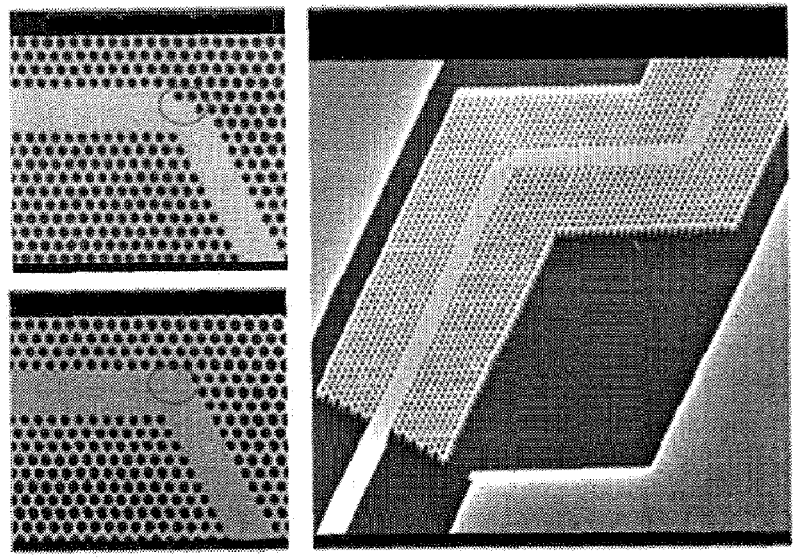
(a)
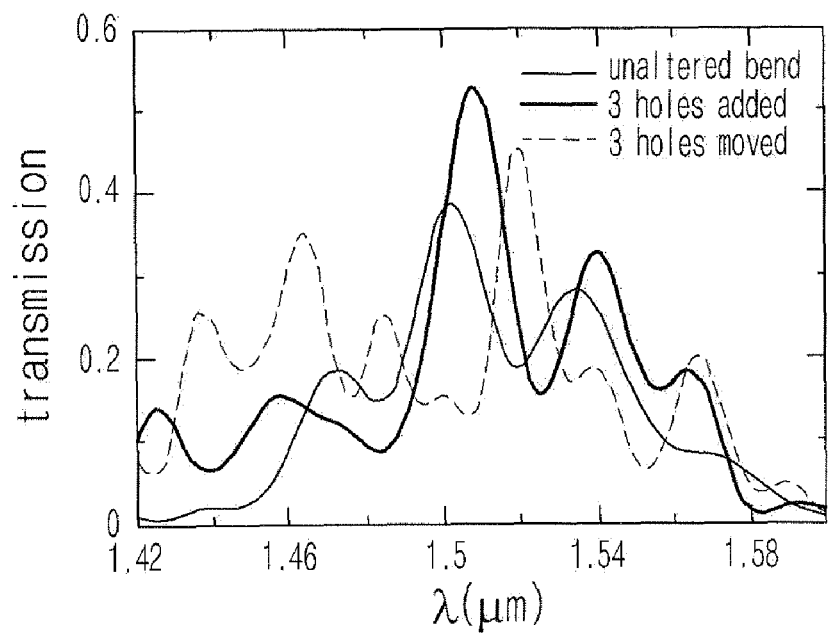
(b)
Prior Art

| wavelength | 1.603 μm |
|---|---|
| group velocity | 0.05c |
| output 1 | 0.178 |
| output 2 | 0.367 |
| increment(%) | 106% |

| wavelength | 1.603 μm |
|---|---|
| group velocity | 0.05c |
| output 1 | 0.178 |
| output 3 | 0.384 |
| increment(%) | 116% |

PHOTONIC CRYSTAL WAVEGUIDE INLET STRUCTURE

CROSS-REFERENCES TO RELATED APPLICATION

This patent application claims the benefit of priority under 35 U.S.C. §119 from Korean Patent Application No. 10-2008-0122359 filed on Dec. 4, 2008, the contents of which are incorporated herein by reference.

BACKGROUND OF THE INVENTION

1. Field of the Invention

The present disclosure relates to a photonic crystal waveguide inlet structure for improving coupling efficiency of a strip waveguide and a photonic crystal waveguide.

2. Description of the Related Art

Photonic crystal structures, that enormously reduce the sizes of photonic devices, are good alternative plans for photonic integration, and dispersion characteristic thereof is adjusted to manufacture photonic switches or photonic modulators. Strip waveguides, which are convenient to manufacture, are widely used to bring light into photonic crystal waveguides.

Recently, active research has been carried out on slow light. A group velocity of light is decreased to increase non-linear characteristic, thereby decreasing the lengths of interferometers. This allows various applications. For example, the sizes of photonic modulators can be reduced, and photonic buffers can be realized.

FIG. 1 is a schematic view illustrating structure of a photonic crystal waveguide and a strip waveguide in the related art. FIG. 2 is a view illustrating a simulation result with regard to the structure of FIG. 2. FIG. 3 is a view illustrating a case in which transmission efficiency is changed even when a little modification is made on air hole arrangement in crystal structure of a photonic crystal waveguide in the related art.

Referring to FIG. 1, in the structure of the photonic crystal waveguide and the strip waveguide, phase interference of a surface mode component generated at a junction by junction phase adjustment of a photonic crystal region improves the transmission efficiency. That is, a position where the photonic crystal waveguide contacts the strip waveguide, is adjusted to generate the surface mode in a perpendicular direction to an incident direction of light to photonic crystals, thereby improving coupling efficiency.

Referring to FIG. 2, the simulation result with regard to the structure of the photonic crystal waveguide and the strip waveguide is illustrated with an incident wave and an output wave thereof.

Referring to FIG. 3, a photonic crystal waveguide bend structure improves the transmission efficiency by adding air holes, in which a traveling direction is abruptly changed in the photonic crystal waveguide in the related art. That is, the transmission efficiency is improved by adding the air holes to a photonic crystal waveguide 60° bend structure.

However, since traveling modes of the light in the strip waveguide and the photonic crystal waveguide are different from each other, mismatch of the modes occurs in a region where the waveguides contact each other. Furthermore, this mismatch of the modes causes coupling loss.

SUMMARY OF THE INVENTION

Embodiments of the present invention are directed to provide a photonic crystal waveguide inlet structure in which a hybrid shape waveguide region is disposed between a strip waveguide and a photonic crystal waveguide to reduce coupling loss of the strip waveguide and the photonic crystal waveguide, thereby making efficient mode conversion between the strip waveguide and the photonic crystal waveguide.

Embodiments of the present invention are also directed to provide a photonic crystal waveguide inlet structure in which the positions of air holes in a region where a strip waveguide contacts a photonic crystal waveguide are adjusted to cancel the phases of waves reflected from the air holes to bring much light into the photonic crystal waveguide.

According to an aspect of the present invention, there is provided a photonic crystal waveguide inlet structure for improving coupling efficiency of a photonic crystal waveguide and a strip waveguide, the structure comprising an inlet region of the photonic crystal waveguide, wherein the photonic crystal waveguide includes: photonic crystals in which air holes are arranged in a triangle lattice shape in a dielectric; and a hybrid waveguide in which at least one of the air holes is removed, the hybrid waveguide spacing the inlet region apart from the strip waveguide.

Also, the inlet region of the photonic crystal waveguide may be spaced a width ranging from $$\frac{\sqrt{3}}{4}a$$

to $$\frac{\sqrt{3}}{2}a,$$

from the strip waveguide, and a may be a lattice constant of the photonic crystal waveguide.

Also, the inlet region of the photonic crystal waveguide has a start point, and α position where the photonic crystal waveguide contacts the strip waveguide may have a width that ranges from α to $$\frac{3}{2}a,$$

from the start point, and α may be a lattice constant of the photonic crystal waveguide.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic view illustrating structure of a photonic crystal waveguide and a strip waveguide in the related art;

FIG. 2 is a view illustrating a simulation result with regard to structure of a photonic crystal waveguide and a strip waveguide in the related art;

FIGS. 3a and 3b are a view illustrating a case in which transmission efficiency is improved by adding air holes to a photonic crystal waveguide in the related art;

DESCRIPTION OF THE PREFERRED EMBODIMENTS

Figure 4:
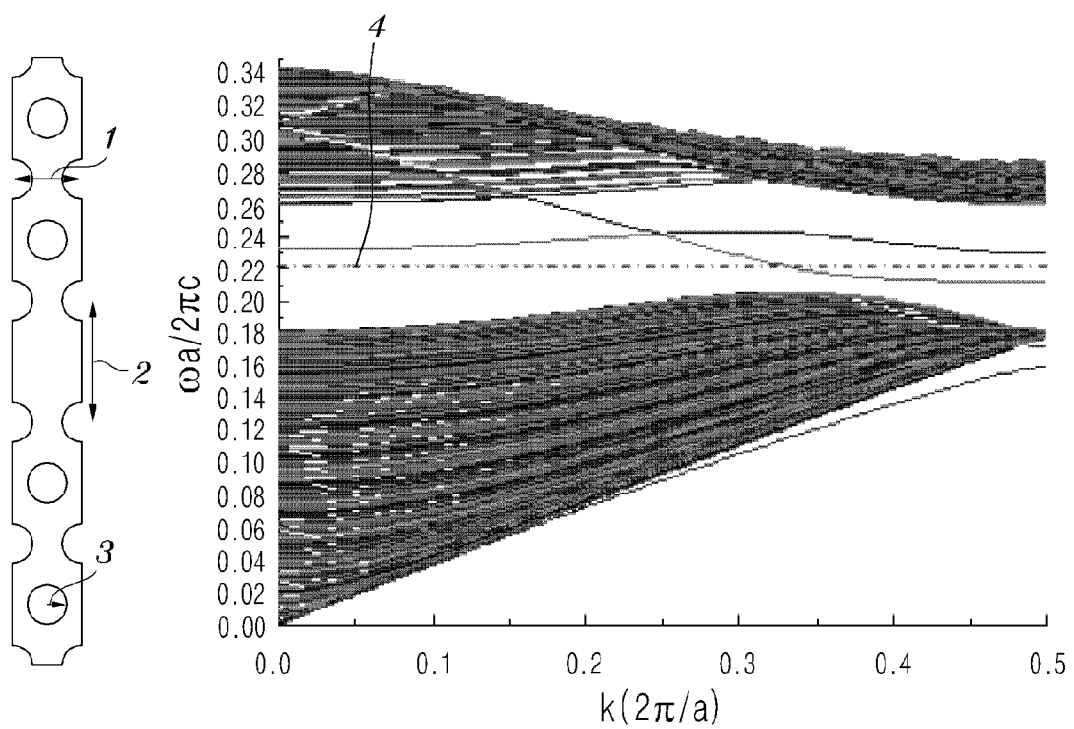
FIG. 4 is a schematic view illustrating structure and dispersion characteristic of a photonic crystal waveguide according to an embodiment of the present invention.

Features and advantages of the present invention will be more clearly understood by the following detailed description of the present preferred embodiments by reference to the accompanying drawings. It is first noted that terms or words used herein should be construed as meanings or concepts corresponding with the technical sprit of the present invention, based on the principle that the inventor can appropriately define the concepts of the terms to best describe his own invention. Like reference numerals refer to like elements throughout. Also, it should be understood that detailed descriptions of well-known functions and structures related to the present invention will be omitted so as not to unnecessarily obscure the important point of the present invention.

Hereinafter, specific embodiments of the present invention will be described in detail with reference to the accompanying drawings.

A photonic crystal waveguide according to the present invention includes photonic crystals and a waveguide. In the photonic crystals, air holes are arranged in a triangle lattice shape in a dielectric. The waveguide is formed by removing a line of the air holes arranged in the photonic crystals. A mode in which light travels at a strip waveguide is different from a mode in which light travels at the photonic crystal waveguide, and mismatch of modes occurs in a region where the two waveguides contact each other. This mismatch of the modes causes coupling loss. According to the present invention, the structure of the region where the two waveguides contact each other is modified to provide a hybrid shape region between the strip waveguide and the photonic crystal waveguide, thereby providing a structure minimizing the coupling loss.

Figure 5:
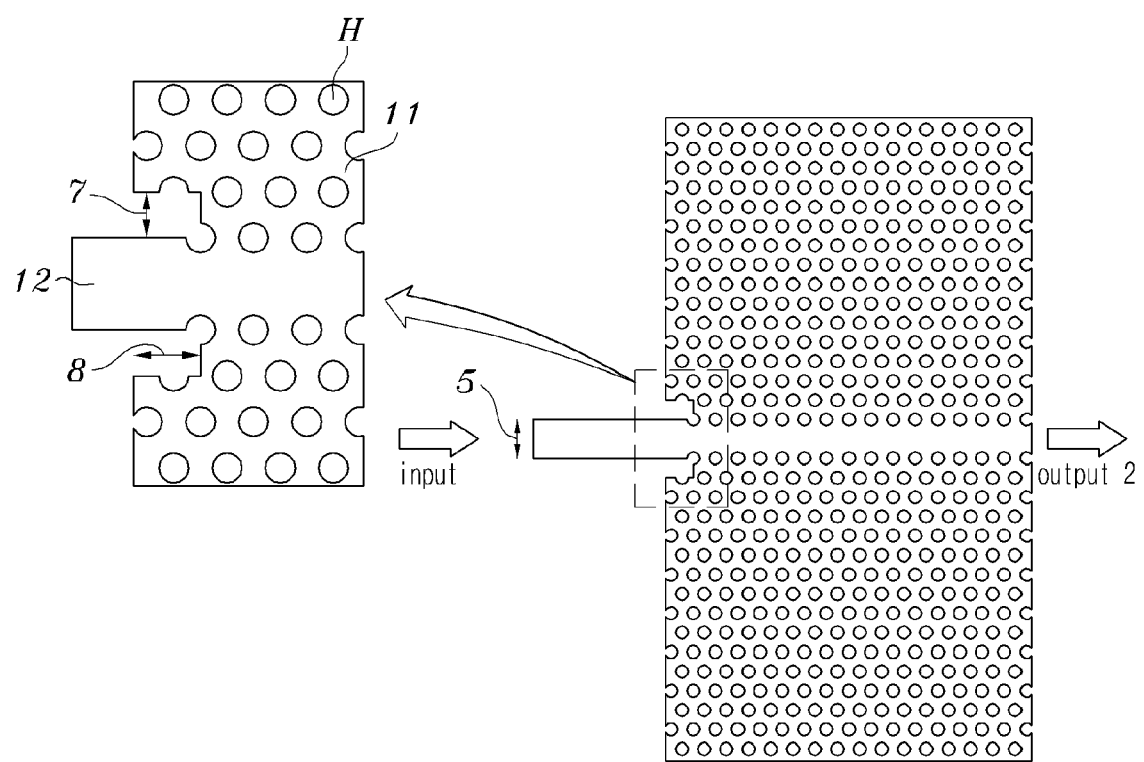
FIG. 5 is a schematic view illustrating structure of a strip waveguide and an inlet of a photonic crystal waveguide according to an embodiment of the present invention.
Figure 6:
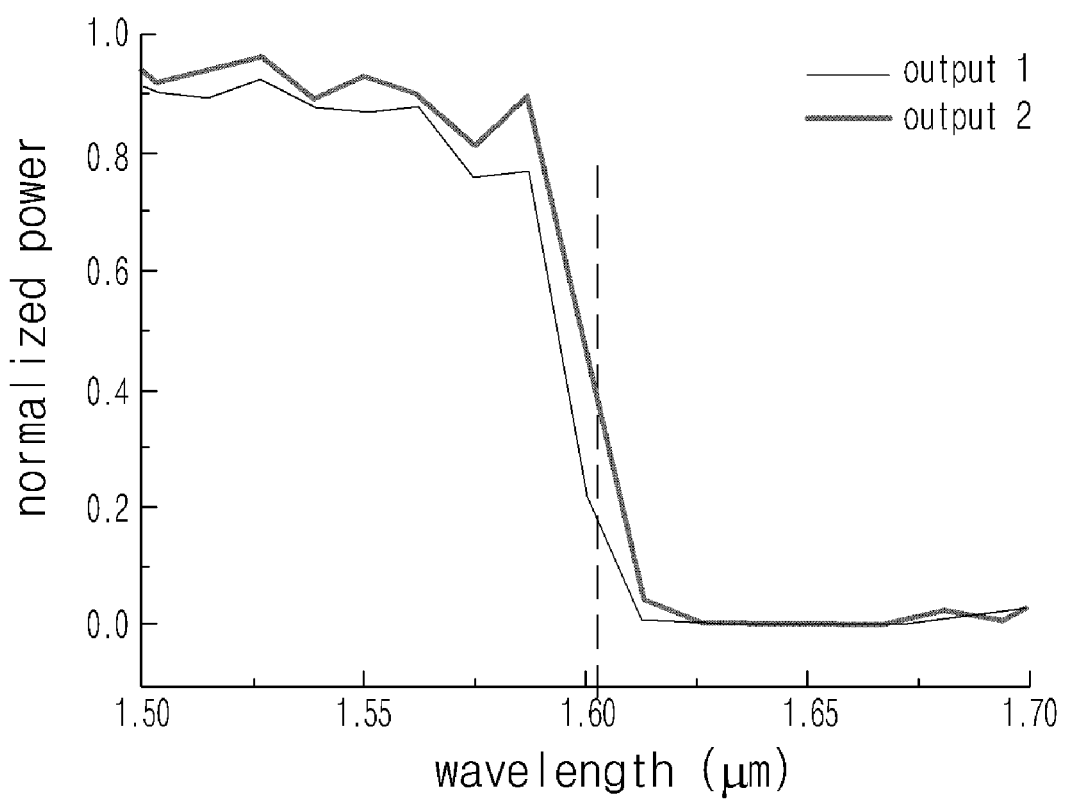
FIG. 6 is a view illustrating simulation results with regard to FIGS. 2 and 5.

FIG. 4 is a schematic view illustrating structure and dispersion characteristic of a photonic crystal waveguide according to an embodiment of the present invention. FIG. 5 is a schematic view illustrating structure of a strip waveguide and an inlet of a photonic crystal waveguide according to an embodiment of the present invention. FIG. 6 is a view illustrating simulation results with regard to FIGS. 2 and 5.

Referring to FIG. 4, the structure and the dispersion characteristic of the photonic crystal waveguide will now be described. A lattice constant 1 of the photonic crystal waveguide is denoted by $\alpha$, and a size 3 of an air hole is expressed by $r=0.28 \times a$. A width 2 of the photonic crystal waveguide, formed by removing a line of the air holes, is approximately 1.55 μm that is a center wavelength of an incident wave.

Referring to FIG. 5, the structure of the inlet of the photonic crystal waveguide with the strip waveguide is a photonic crystal waveguide structure for improving the coupling efficiency between the photonic crystal waveguide 11 and the strip waveguide 12.

The photonic crystal waveguide includes the photonic crystals in which air holes H are arranged in a triangle lattice shape in a dielectric, and a hybrid waveguide (a region defined by the widths 7 and a width 8) formed by removing at least one of the air holes H and then by spacing the inlet region of the photonic crystal waveguide 11 the widths 7 from the strip waveguide 12. The dielectric is a silicon medium. The width 7 is a width with regard to the hybrid waveguide (the region defined by the widths 7 and 8). That is, an inlet region of the photonic crystal waveguide may be spaced widths 7 each ranging from $$\frac{\sqrt{3}}{4}a$$

to $$\frac{\sqrt{3}}{2}a,$$

from the strip waveguide 12. A position where the photonic crystal waveguide 11 and the strip waveguide 12 contact each other is an end with the width 8 of the hybrid waveguide (the region defined by the widths 7 and 8) in the inlet region of the photonic crystal waveguide 11. That is, the width 8 of the position where the photonic crystal waveguide and the strip waveguide contact each other, may be range from $\alpha$, to $$\frac{3}{2}a,$$

from a start point in the inlet of the photonic crystal waveguide.

Sides of the region where the photonic crystal waveguide 11 contacts the strip waveguide 12 are spaced the widths 7 from the strip waveguide 12, so that light traveling through the strip waveguide 12 passes through the hybrid region (defined by the widths 7 and the width 8) of the strip waveguide 12 and the photonic crystal waveguide 11, so as to improve efficiency in mode conversion of the photonic crystal waveguide 11.

Referring to FIG. 6, the simulation result with regard to FIG. 5 is compared with the simulation result with regard to FIG. 2. This comparison shows the efficiency is increased by approximately 106% at a wavelength of approximately 1.603 μm with a group velocity of approximately 0.05 c.

Figure 7:
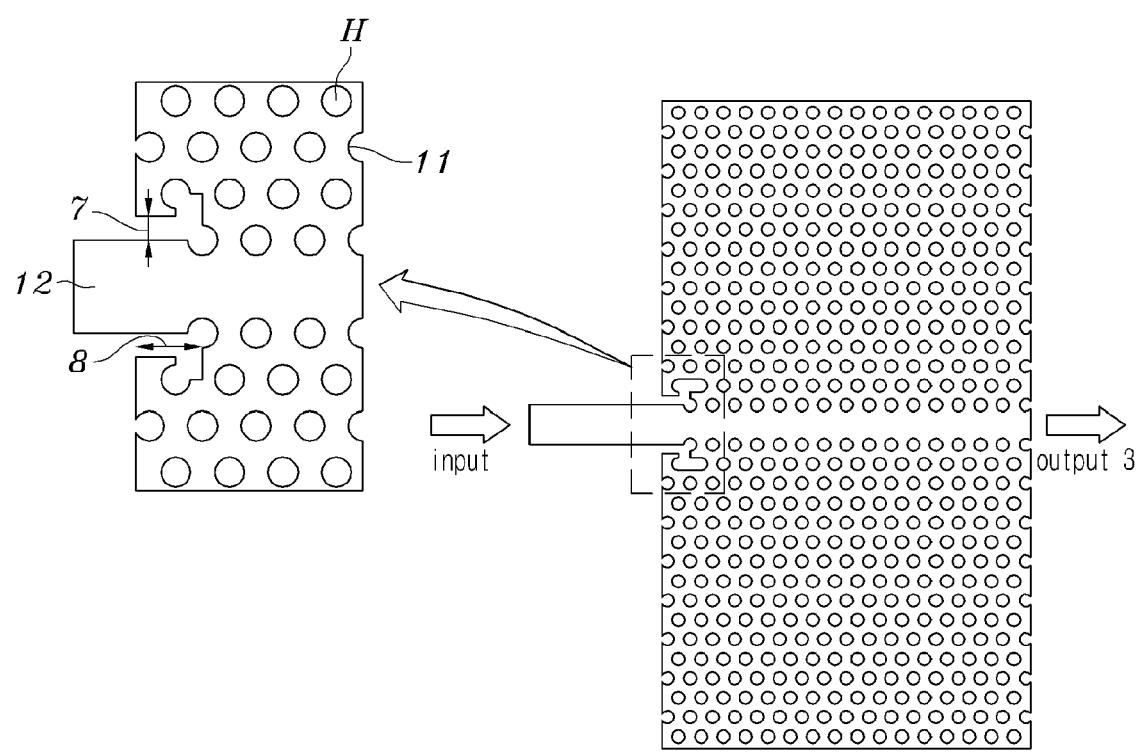
FIG. 7 is a schematic view illustrating a lateral spacing size in a strip waveguide and a photonic crystal waveguide according to an embodiment of the present invention.
Figure 8:
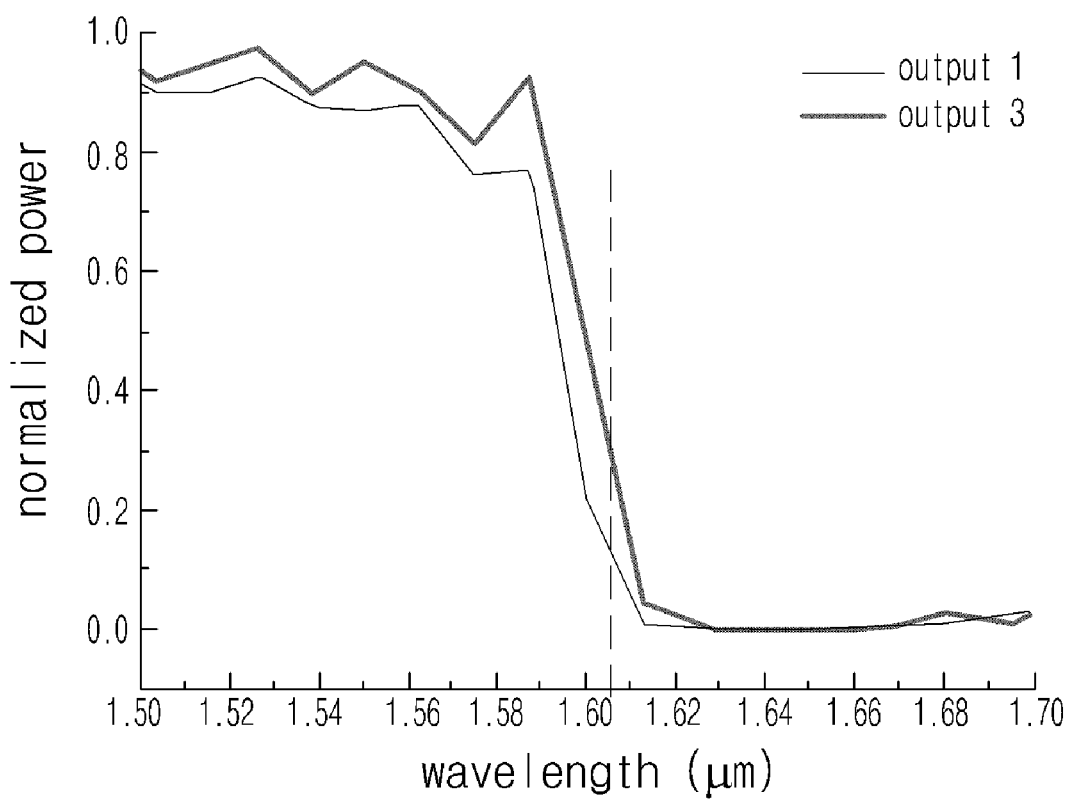
FIG. 8 is a view illustrating comparison of a simulation result with regard to FIG. 7 with the simulation result with regard to FIG. 2.

FIG. 7 is a schematic view illustrating a lateral spacing size 7 in a strip waveguide 12 and a photonic crystal waveguide 11 according to an embodiment of the present invention. FIG. 8 is a view illustrating comparison of a simulation result with regard to FIG. 7 with the simulation result with regard to FIG. 2.

Referring to FIGS. 7 and 8, the lateral spacing size 7 of the strip waveguide 12 and the photonic crystal waveguide 11 is adjusted, and the simulation result with regard to FIG. 7 is compared with the simulation result with regard to FIG. 2. This comparison shows the efficiency is increased by approximately 116% at a wavelength of approximately 1.603 μm with a group velocity of approximately 0.05 c.

Figure 9:
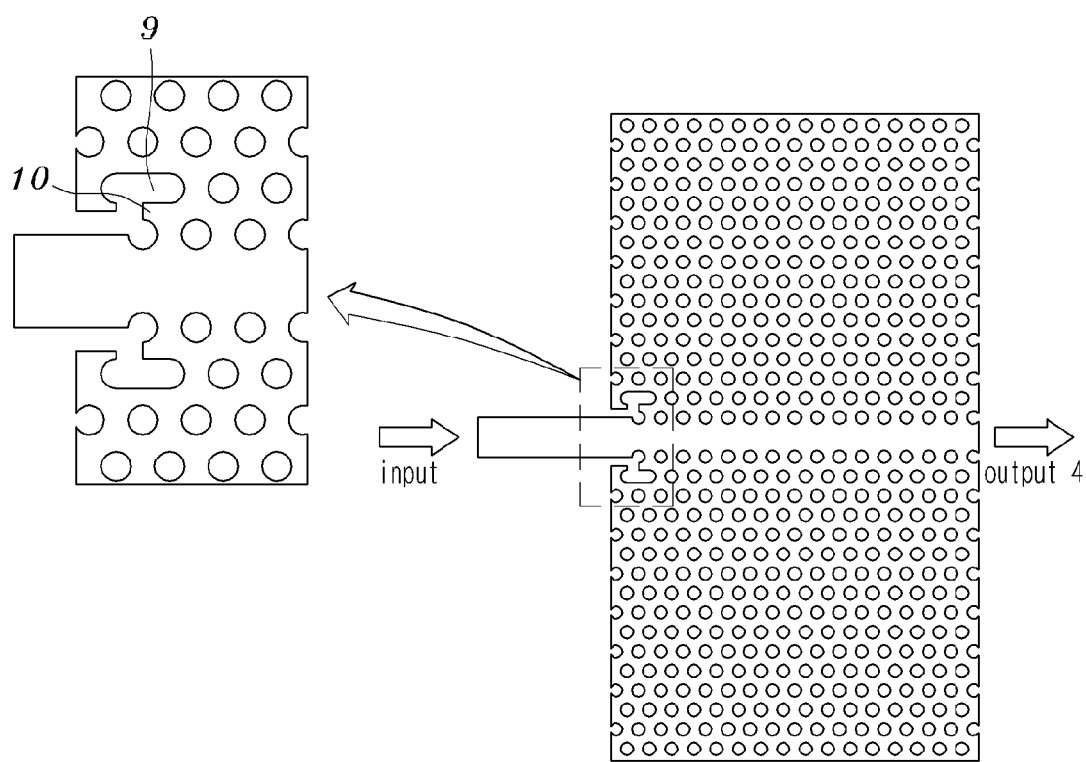
FIG. 9 is a view illustrating a process tolerance in a process of manufacturing a strip waveguide and a photonic crystal waveguide according to an embodiment of the present invention.
Figure 10:
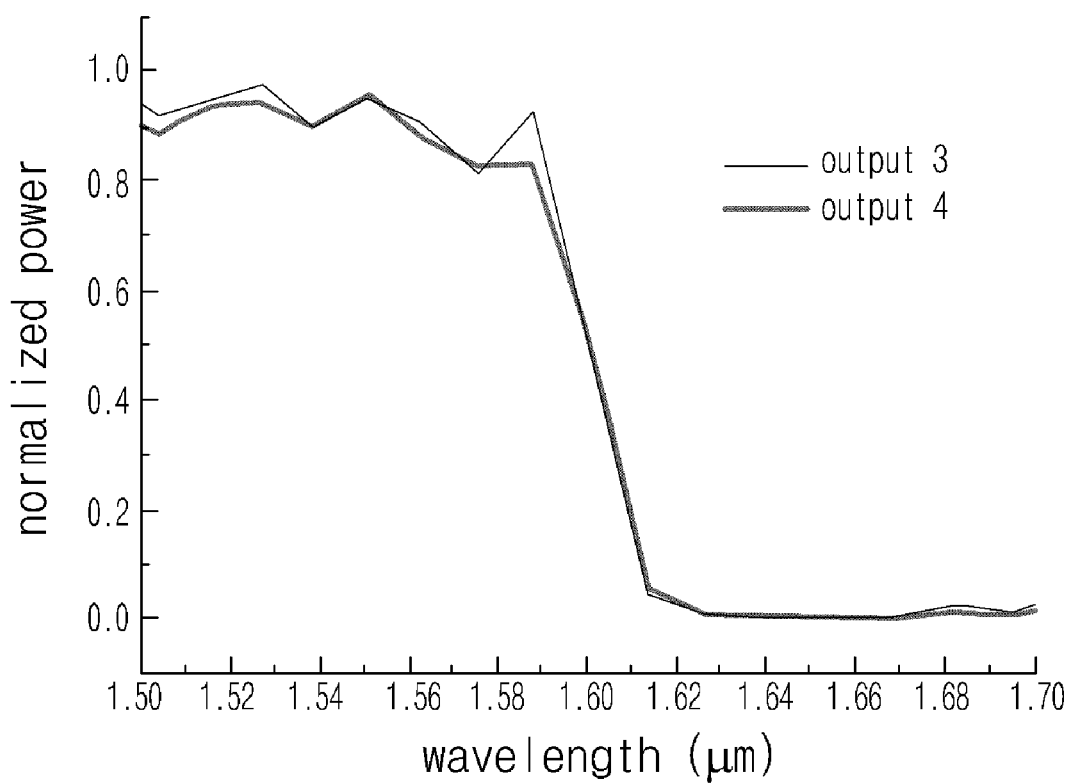
FIG. 10 is a view illustrating comparison of a simulation result with regard to FIG. 9 with the simulation result with regard to FIG. 7.

FIG. 9 is a view illustrating a process tolerance in a process of manufacturing a strip waveguide and a photonic crystal waveguide according to an embodiment of the present invention. FIG. 10 is a view illustrating comparison of a simulation result with regard to FIG. 9 with the simulation result with regard to FIG. 7.

Referring to FIGS. 9 and 10, the transmission efficiency is substantially not decreased even when two holes are connected to form structures 9 and 10 in an etch process, which is the process tolerance in the process of manufacturing the strip waveguide and the photonic crystal waveguide according to this embodiment.

Figure 11:
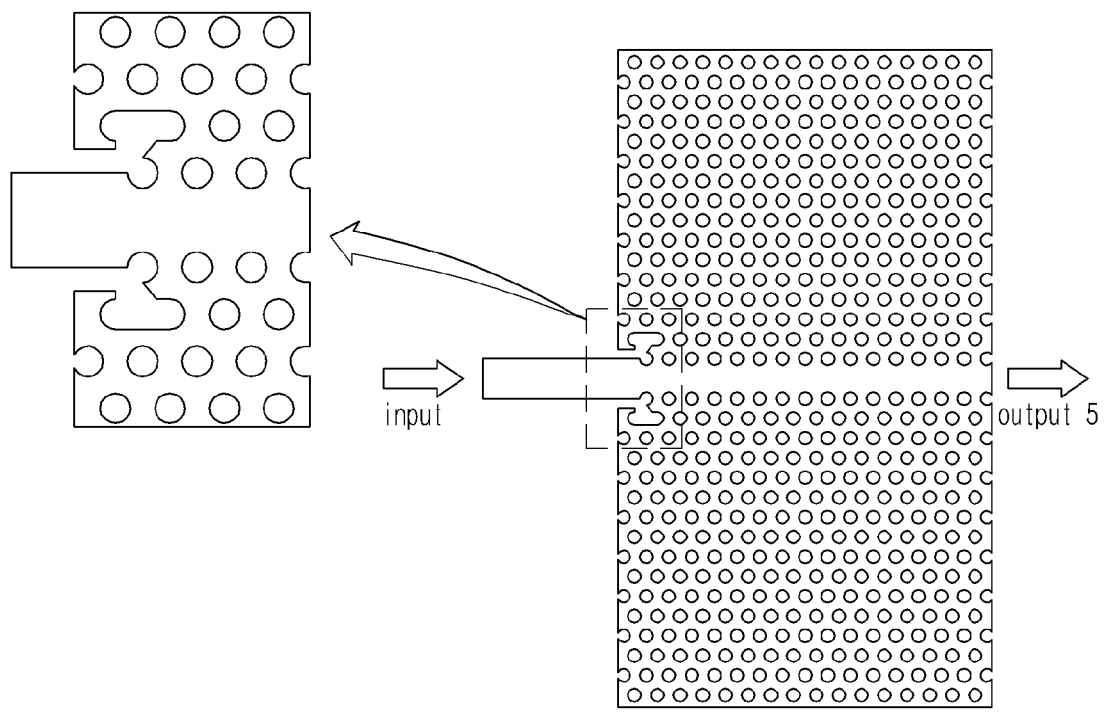
FIG. 11 is a view illustrating a process tolerance in a process of manufacturing a strip waveguide and a photonic crystal waveguide according to an embodiment of the present invention.
Figure 12:
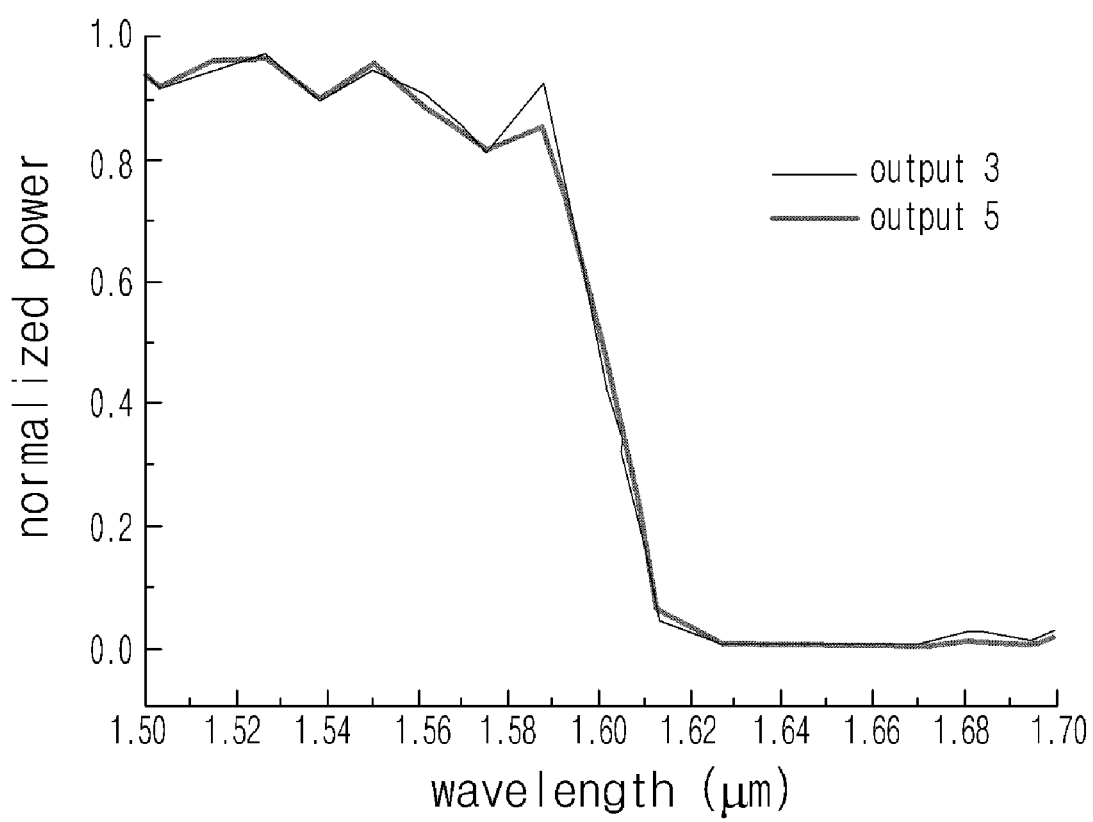
FIG. 12 is a view illustrating comparison of a simulation result with regard to FIG. 11 with the simulation result with regard to FIG. 7.

FIG. 11 is a view illustrating a process tolerance in a process of manufacturing a strip waveguide and a photonic crystal waveguide according to an embodiment of the present invention. FIG. 12 is a view illustrating comparison of a simulation result with regard to FIG. 11 with the simulation result with regard to FIG. 7.

Referring to FIGS. 11 and 12, the transmission efficiency is substantially not decreased even when the remaining one 10 of the structures 9 and 10 is removed in the etch process of FIG. 9, which is the process tolerance in the process of manufacturing the strip waveguide and the photonic crystal waveguide according to this embodiment.

That is, as illustrated in the FIGS. 9 through 12, even when a little structure modification is made in photonic crystal inlet structures, the transmission efficiency is increased by approximately 100% or more at a wavelength with a group velocity of 0.05 c. In other words, extra costs or structures for increasing the transmission efficiency are not required, and the transmission efficiency is substantially not affected by the process tolerance.

The photonic crystal waveguide structure configured as described above, includes the hybrid waveguide that is disposed between the strip waveguide and the photonic crystal waveguide to reduce the coupling loss of the strip waveguide and the photonic crystal waveguide, thereby efficiently improving the mode conversion between the strip waveguide and the photonic crystal waveguide, and adjusts the positions of the air holes at the region where the strip waveguide contacts the photonic crystal waveguide so as to cancel the phases of waves reflected from the air holes, thereby bringing much light into the photonic crystal waveguide.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A photonic crystal waveguide inlet structure for improving coupling efficiency of a photonic crystal waveguide and a strip waveguide, the structure comprising an inlet region of the photonic crystal waveguide,
wherein the photonic crystal waveguide includes:
photonic crystals in which air holes are arranged in a triangle lattice shape in a dielectric; and
the inlet region of the photonic crystal waveguide has a start point, and a position where the photonic crystal waveguide contacts the strip waveguide has a length of $3/2\alpha$ from the start point, and the start point and the position where the photonic crystal waveguide contacts the strip waveguide of the inlet region of the photonic crystal waveguide are spaced with a same width that ranges from $$\frac{\sqrt{3}}{4}\alpha \text{ to } \frac{\sqrt{3}}{2}\alpha$$

from the strip waveguide and the inlet region is in rectangular form so that at least one air hole is removed in a widthwise direction, of the rectangular inlet region,
wherein $\alpha$ is a lattice constant of the photonic crystal waveguide.

2. The structure as set forth in claim 1,
wherein dielectric between the rectangular inlet region and the closest air hole is removed in rectangular form, or
wherein dielectric between the rectangular inlet region and the closest air hole and dielectric between the rectangular inlet region and the secondly closest air hole is removed in rectangular form, and the closest air hole and the secondly closest air hole are connected to each other.

* * * * *